United States Patent [19]

Reavely et al.

[11] Patent Number: 4,704,240

[45] Date of Patent: Nov. 3, 1987

[54] METHOD OF FABRICATING TUBULAR COMPOSITE STRUCTURES

[75] Inventors: Richard T. Reavely, Madison; Peter C. Ogle, Woodbridge, both of Conn.; Robert V. Kromrey, Campbell, Calif.

[73] Assignee: United Technologies Corporation, Hartford, Conn.

[21] Appl. No.: 907,954

[22] Filed: Sep. 10, 1986

[51] Int. Cl.$^4$ .................. B29C 65/02; B29D 23/00
[52] U.S. Cl. .................................. 264/102; 264/257; 264/313; 264/314; 425/389; 425/405 H; 425/DIG. 19; 425/DIG. 44
[58] Field of Search ............... 264/102, 314, 512, 571, 264/313, 257, 137, 510; 425/389, DIG. 19, DIG. 44, 405 H

[56] References Cited

U.S. PATENT DOCUMENTS

| | | | |
|---|---|---|---|
| 3,135,640 | 6/1964 | Kepka et al. | 264/571 |
| 3,556,201 | 1/1971 | Sander . | |
| 3,843,601 | 10/1974 | Bruner . | |
| 4,148,597 | 4/1979 | Larsen | 264/314 |
| 4,167,430 | 9/1979 | Arachi . | |
| 4,264,556 | 4/1981 | Kumar et al. . | |
| 4,388,263 | 6/1983 | Prunty . | |
| 4,428,906 | 1/1984 | Rozmus | 425/405 H |
| 4,547,337 | 10/1985 | Rozmus . | |
| 4,624,820 | 11/1986 | Barraclough | 264/512 |

FOREIGN PATENT DOCUMENTS 2134168 7/1971 Fed. Rep. of Germany ...... 264/320
3410050 9/1985 German Democratic Rep. ................................ 264/314

Primary Examiner—Jan H. Silbaugh
Assistant Examiner—J. F. Durkin
Attorney, Agent, or Firm—A. Dean Olson

[57] ABSTRACT

A method of fabricating a fiber reinforced resin composite article having tubular structures that has improved density and fewer voids. The method comprises laying up a prepreg that has at least two tubular structures and disposing a thermally conductive metallic support structure within and in contact with the tubular structures. The prepreg is disposed within and in substantially complete contact with a tool which has at least one hole. An expandable bag having at least one opening in communication with a tube is inserted within each tubular structure thereby forming a void space between the bag and the tubular structure. The void space is substantially filled with a solid flowable particulate silicone rubber that contacts the prepreg and the tube is sealed to edge of hole in the tool. The solid flowable rubber is caused to transfer a substantially uniform predetermined pressure to the surface of the prepreg by pressurizing the expandable bag. The composite prepreg is exposed to heat by conducting heat through the thermally conductive metallic support structure in order to cure the composite article.

3 Claims, 2 Drawing Figures

METHOD OF FABRICATING TUBULAR COMPOSITE STRUCTURES

This invention was made with Government support. The Government has certain rights in this invention.

CROSS REFERENCE

This application relates to commonly assigned co-pending applications Ser. No. 829,048 filed Feb. 13, 1986, entitled "Molding Method and Apparatus Using a Solid, Flowable, Polymer Medium"; and Ser. No. 907,959 entitled "Solid Flowable Polymer Molding Medium"; Ser. No. 907,943 entitled "Solid Flowable Polymer Medium with Metal Additives and Method of Molding Using Same"; Ser. No. 907,946 entitled "High Temperature Solid Flowable Polymer Medium and Method of Molding Using Same"; Ser. No. 907,942 entitled "Method for Molding a Carbon-Carbon Composite"; Ser. No. 907,947 entitled "Method for Molding Using a Dual Solid Flowable Polymer System"; Ser. No. 907,952 entitled "Method for Recovering a Solid Flowable Polymer Medium"; Ser. No. 907,955 entitled "Solid Flowable Medium Having a Thermal Stability Additive and Method for Molding Using Same"; Ser. No. 907,958 entitled "Method of Vacuum Bagging Using a Solid Flowable Polymer"; and Ser. No. 907,957 entitled "Solid Flowable Polymer Medium with U.V. Detectable Additive and Method for Molding Using Same", filed on even date herewith, which disclose material related to that contained herein, the disclosures of which are hereby incorporated by reference.

DESCRIPTION

TECHNICAL FIELD

The field of this invention relates to methods of making composite articles.

BACKGROUND ART

Composite materials are of great current interest because they provide a very favorable combination of high strength and low density. Typically, a composite material is comprised of fibers of graphite embedded within an epoxy, phenolic or other polymer resin matrix. The more advanced composites which have particularly favorable high strength to density ratio properties are especially attractive for aerospace applications. Typical of other advanced aerospace materials, they present comparative processing difficulties; it is insufficient to make a simple layup of the fibers and resin followed by room temperature curing. Aerospace composite materials not only involve more difficult to fabricate resins but often essentially defect-free finished parts must be produced.

Multicell (multitubular) composite structures have been produced by passing pressure bags through each tube then sealing these pressure bags to each other and to the outer tool or vacuum bag. A vacuum is drawn on the vacuum bag and external autoclave pressure is applied to the pressure bags. However, this method is labor intensive and can be unreliable because of the complexity of the bag end seals. In addition, the bags can apply uneven pressure to the composite prepreg resulting from bridging defects (voids in composite corners caused by pressure deficiencies).

Accordingly, there has been a constant search in this field of art for new methods of making composite tubular structures.

DISCLOSURE OF INVENTION

The invention is directed to a method of fabricating a fiber reinforced resin composite article having tubular structures that has improved density and fewer voids. The method comprises laying up a prepreg that has at least two tubular structures and disposing a thermally conductive metallic support structure within and in contact with the tubular structures. The prepreg is disposed within and in substantially complete contact with a tool which has at least one hole. An expandable bag having at least one opening in communication with a tube is inserted within each tubular structure thereby forming a void space between the bag and the tubular structure. The void space is substantially filled with a solid flowable particulate silicone rubber that contacts the prepreg and the tube is sealed to edge of hole in the tool. The solid flowable rubber is caused to transfer a substantially uniform predetermined pressure to the surface of the prepreg by pressurizing the expandable bag. The composite prepreg is exposed to heat by conducting heat through the thermally conductive metallic support structure in order to cure the composite article.

This invention makes a significant advance in the field of composite fabrication by providing technology to fabricate multicell components that have improved density and fewer voids.

The foregoing and other features and advantages of the present invention will become more apparent from the following description and accompanying drawings.

BEST MODE FOR CARRYING OUT THE INVENTION

Figure 1:
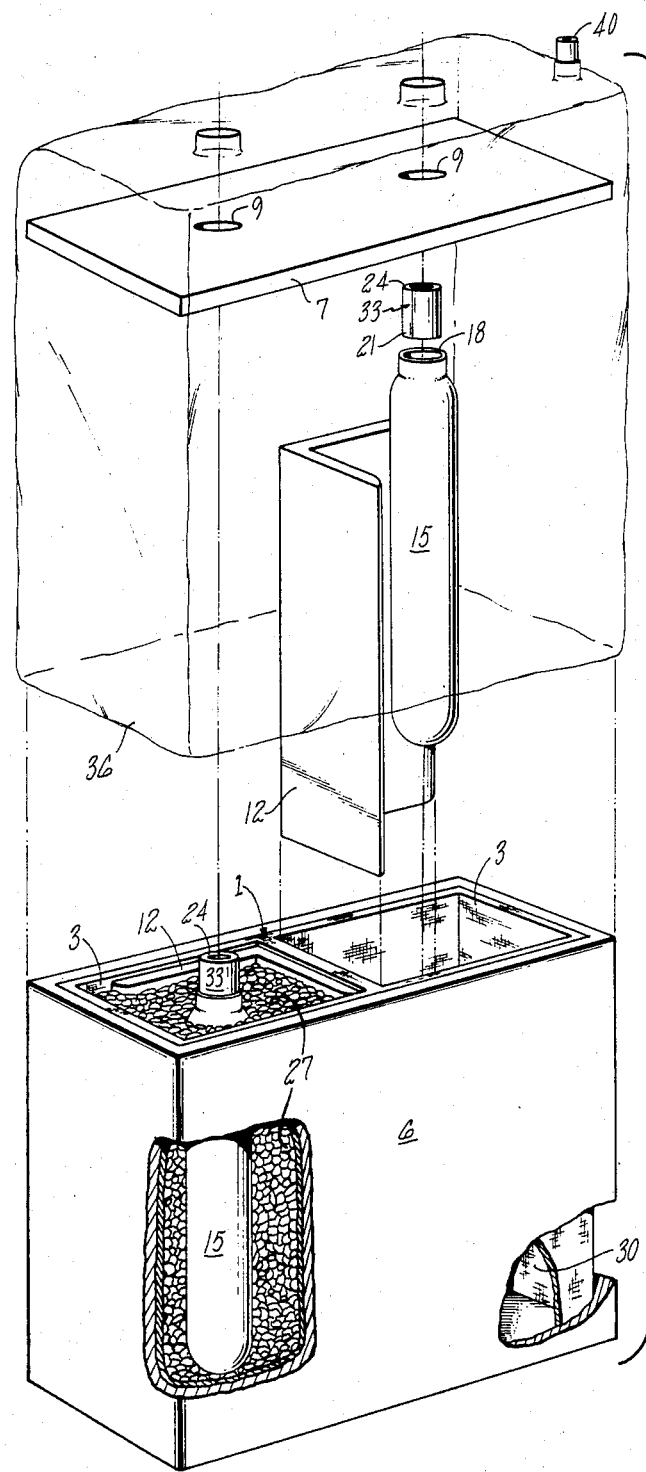
FIG. 1 is an exploded perspective view partly broken away and partly in section of the method of this invention wherein a solid flowable particulate rubber transmits pressure from an expandable bag to a composite prepreg having tubular structures, and a metallic structure transfers heat to the composite prepreg having tubular structures.
Figure 2:
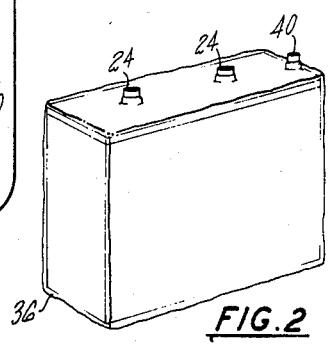
FIG. 2 illustrates a reduced size view of the mold assembly of FIG. 1 fully assembled.

FIG. 1 illustrates an exploded perspective view partially cutaway of the method of this invention. A conventional composite prepreg 1 (as described below) having cells (at least two tubular structures) 3 is disposed in a tool (mold) 6 which provides outside support to the prepreg 1. Thus, the tool 6 is in substantially complete contact with the outer surface of the prepreg 1. The tool 6 has a hole defined by an edge 9 in the tool's cover plate 7. Preferably at least one thermally conductive metallic support structure 12 is disposed within and in contact with the cell(s) 3. An especially preferred support is an L-shaped aluminum structure as it is thermally conductive, lightweight, easy to fabricate, and provides good support to the web (that portion of the multicell structure not supported by the outside tool) during the curing process. The larger and greater surface area that support 12 has, the more support will be provided to the prepreg, and the more heat will be conducted to the prepreg.

An expandable inner bag (e.g. elastomeric silicone, collapsed bag) 15 that has an opening defined by an edge 18 is sealed (e.g. clamped bonded) to a first end 21 of a tube 33, typically metal (also having a second end 24) so that bag 15 and tube 33 are in gas communication. The bag 15 is capable of expanding under pressure and capable of withstanding pressures up to about 1034 kiloPascals (kPa) (150 pounds per square inch (psi)) and should also be air tight. An exemplary material is No. 1453 silicone available from Mosites Rubber Co. (Fort Worth, Tex.). The bag(s) 15 is preferably disposed through the cell(s) 3. This forms a void space 30 between the cell 3 and the bag 15. Then a solid flowable particulate silicone rubber 27 (described below) is substantially filled in to the void space 30 between the bag 15 and the cell 3. The silicone rubber is in contact with the prepreg 1. By substantially filled is meant about 90%. The order of the above steps is not critical; however it is easier to place the bag 15 into the void space 30 before the rubber 27 is introduced to fill the void space 30.

An outer vacuum bag 36 surrounds the tool 6 with its open end sealed, and is also sealed to the second tube ends 24 so that the tube is in communication with the environment. Preferably the metal tube 33 has a smaller diameter than the edge 9 in the tool 6 to allow for gas communication between the void space 30 and the area between the outer vacuum bag 36 and the tool 6. Although typically the tool is not air tight and so allows for gas communication. The bag may have a second opening that is in communication with a second metal tube that is in communication with the environment through another hole defined by an edge 9 in the tool 6. A vacuum is drawn at port 40 so that the area between the vacuum bag 36 and the tool 6 and the area between the bag 15 and the cell 3 (e.g. void space 30) is substantially evacuated. By substantially is meant about 50% to about 75%. Typically, a vacuum of about 380 millimeters (mm) mercury is sufficient. The evacuation of air reduces the possibility that an air bubble might migrate into the composite and cause a void, a geometric defect, or get trapped between the tool and the laminate causing poor laminate surface quality.

Alternatively, the second tube end 24 is sealed with the tool edge 9. In this case an outer vacuum bag is not utilized and the area between the elastomeric bag 15 and the prepreg 1 is not evacuated.

The entire assembly is placed in an autoclave where it is exposed to pressures of about 172 KPa (25 psi) to about 1034 KPa (150 psi). This causes the elastomeric bag 15 to expand causing the solid flowable polymer 27 (in contact with the prepreg 1) to transfer a substantially uniform predetermined pressure (the autoclave pressure) to the surface of the composite prepreg 1.

The composite prepreg 1 is also exposed to temperatures of about 121 degrees centigrade (°C.) (250° F.) to about 175° C. (350° F.) in order to cure the part. This is preferably done by conducting heat through the thermally conductive metallic support 12 directly to the composite prepreg 12. In addition, typically the autoclave is heated.

Although the above method has been given in a preferred order, the order may change so long as it does not deleteriously affect the process as a whole.

This method can be utilized to make conventional composites from conventional composite precursor materials. Examples of resins include epoxy, phenolic and polyester. An example is 5225 epoxy available Narmco (Anaheim, Calif.). Graphite fiber is an exemplary reinforcing material and prepregs of this material are available from Narmco.

The particular polymeric medium useful in the present invention is critical. Its responsiveness to temperature and pressure coupled with its flowability and solid nature at molding temperatures enable it to be useful. These properties cause the medium to produce an advantageous, substantially uniform, controllable pressure on the surface of the article precursor. By substantially uniform is meant within about 10%. In a typical embodiment of the invention, the polymer is an unfilled silicone rubber particulate of $-4 +30$ U.S. mesh sieve size (4.7-0.42 millimeter (mm)), which when pressurized, is sufficiently self-compliant to coalesce as an essentially void-free medium at a pressure of the order of 69 kPa (10 pounds per square inch (psi)).

Typically, a silicone rubber is used as the pressurizing polymer. Most preferably, the rubber is an improvement on the type which is described in U.S. Pat. No. 3,843,601 to Bruner. See also U.S. Pat. No. 4,011,929 to Jeram et al. The disclosures of both patents are hereby incorporated by reference. Generally, the preferred materials are dimethylsilicones that have vinyl groups. They may be produced by conventional commercial procedures, including production from polysiloxanes using various vulcanizing techniques. A preferred material which has been used thus far is the experimental unfilled silicone rubber material designated as X5-8017, formerly No. 6360 81 (more simply 8017 hereinafter), by the Dow Corning Corporation (Midland, Mich.).

Another Dow Corning silicone rubber, No. 93-104, without its ordinary fillers (called "93-104" herein, nonetheless) is useful. The Polygel C-1200 silicone rubber (Stauffer Chemical Company, Westport, Conn. U.S.A.), believed to be essentially the material which is described in the Bruner U.S. Pat. No. 3,843,601 is also useful with the present invention.

Fillers and other adulterants (such as metal particulates to increase thermal conductivity) can be included with and within the medium, provided the essential behavior properties are maintained.

The preferred 8017 silicone rubber is characterized by low strength and high friability. By "high friability" is meant there is such low strength that moderate size solids tend to disintegrate into smaller particulates when subjected to modest mechanical forces, even rubbing between the fingers. The 8017 material has a Shore A hardness of less than 1 (Shore 00 hardness of 50-55) and compressive strength of the order of 70 kPa when measured on a 2.5 cm square by 1.27 cm thick specimen, and upon a compression deformation of about 40%, it shears into smaller particles. This behavior is contrasted with that of more conventional rubbers which have higher strength, greater resistance to deformation and greater elongation to failure. It has also been observed that preferred polymer useful with the present invention forced through a small orifice, or through a 1.1 cm diameter pipe as described below, has a tendency to disintegrate into smaller particulate. By example, it is found that over time a nominal 30 mesh size powder having about 50 weight percent retained on a 40 mesh screen will change to one having only about 25 weight percent retained on 40 mesh.

The aforementioned behavior of the polymer medium enables the fabrication of intricately shaped composite polymer parts with uniform properties under the controlled and independent application of substantially uniform pressure and temperature. In one embodiment of the invention, the polymer has a Shore A hardness of less than about 15, typically less than 8, and desirably less than 1; the compressive strength is less than 1 MPa, and desirably less than 0.2 MPa.

The ability of the inventive medium to flow under molding pressure is believed to be especially reflective of the properties of a good medium. This characteristic allows redistribution of the medium both within and to and from the vessel; it enables control of the absolute level and variability of the pressure. And tests show it is that which distinguishes the materials of the present media from those which have been used heretofore in the pressure pad molding technique. The flowability property can inferentially be seen to be analogous to viscosity. But there is no evident standard test known for measuring this property of importance to the invention. Therefore, a test apparatus was created comprising a cylinder having a downwardly movable piston to test the polymer portion of the medium. The cylinder is filled with the rubber or other medium being tested. A replaceable pipe test section extends from the side of the cylinder and discharges rubber onto a weighing scale, the weight being recorded as a function of time and the pressure applied to the rubber as measured by a transducer. The pipe is a smooth stainless steel tube of 1.1 cm inside diameter and nominally 32–64 RMS (root mean square) surface finish. The pipe length is chosen as desired, with 7.6 cm and 15.2 cm being preferred.

Thus, generally it can be said that the polymer will have flowability, i.e., mass transport can occur when molding pressures are applied. The preferred polymer, when tested in the apparatus described above using 10.3 MegaPascals (MPa) (1500 psi) and a 15.2 cm (6 inch) pipe, has a flow rate of at least 0.6 g/s, typically 6 g/s, and desirably more than 25 g/s.

Further description of the polymer is given below. A particulate elastomer is typically used in the practice of the invention. When the 6360 polymer is used as particulate solids, prior to the application of pressure the particulates are spaced apart at the article precursor surface. But when pressure is applied, the particles self-comply and coalesce into a continuous void-free body. Because of this and their inherent resilience, a substantially uniform hydraulic-like pressure is applied to the article precursor surface. Tests show that the 8017 material without the metal additive will tend to coalesce upon the application of moderate compressive pressure, of the order of 70 kPa; at this point the interfacial boundaries between the particles are so essentially conformed that the compressed rubber becomes translucent instead of opaque. The 8017 material has a true density of 0.97 gram per cubic centimeter (g/cc), an apparent bulk density of 0.5 g/cc as a −30 mesh size powder, and it is compressed to a coalesced translucent material with a density of 0.94–0.97 g/cc by the application of about 70 kPa. (Further compression of captured material, in the range 70 kPa to 13.8 MPa, shows it to have about 0.4% volume change per 10 MPa.) Under the above-described coalesced condition, there is believed to be little void, or gas (except absorbed gas) contained in the interstices between the particulates.

Thus, the preferred material, when used in particulate form, will be self-compliant and will tend to coalesce as an apparent void-free body below a pressure of 350 kPa, preferably 240 kPa; more preferably about 69 kPa.

Based on various molding tests and material property measurements, desirable results have been associated with mediums having low strength, the ability to self-comply under molding level pressures, and the ability to flow and exhibit hydraulic-like behavior. Other silicone rubbers than 8017 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

Tests run on the granular 8017 material showed a maximum variation in pressure of as low as 2% at about 6.9 MPa nominal pressure; other useful materials produced pressures uniform within 10%.

As mentioned above, the tendency for the preferred rubbers to be friable is thought to be desirable.

The usefulness of the materials is also evaluated according to the integrity of a molded finished product, it being well established that inspection will commonly show areas of low density or cracking where the proper application of pressure and temperature has not been achieved, during either the heating or cooling cycle.

The polymer has only been characterized according to the properties of some currently available materials; the data are insufficient to establish that the totality of measured properties in combination are necessary. On the contrary, to a significant extent it is believed there is a redundancy and that they independently characterize the invention.

This invention can be utilized to fabricate a variety of multicell composite parts such as wings, rotor blades and rudders. This invention provides a method for making multicell components that reduces the number of cumbersome seals which are labor intensive and can fail. In addition, this method provides a way of conducting heat directly to the composite prepreg through the use of a thermally conductive support structure. Finally, the solid flowable particulate silicone rubber provides a substantially uniform pressure to the entire prepreg surface and thus facilitates the curing of multicell structures by reducing composite bag bridging defects.

It should be understood that the invention is not limited to the particular embodiment shown and described herein, but that various changes and modifications may be made without departing from the spirit or scope of this concept as defined by the following claims.

We claim:

1. A method particularly adapted for fabricating a fiber reinforced resin composite article having at least two tubular structures comprising:
   a. laying up a prepreg having at least two tubular structures;
   b. disposing a thermally conductive metallic support structure within and in contact with said tubular structures;
   c. disposing said prepreg within and in substantially complete contact with a tool, said tool having at least one hole defined by an edge;
   d. inserting an expandable inner bag, having at least one opening in communication with a tube said tube having first and second openings defined by first and second edges, within each tubular structure thereby forming a void space between each bag and said tubular structure;

e. substantially filling said void space with a solid flowable particulate silicone rubber that is in contact with said prepreg;
f. sealing said tool edge to said tube;
g. causing the solid flowable rubber to transfer a substantially uniform predetermined pressure to the surface of said composite prepreg by pressurizing said expandable inner bag; and
h. exposing said composite prepreg to heat in part by conducting heat through said thermally conductive metallic support structures to cure said composite article;
wherein said composite has improved density and fewer voids.

2. The method as recited in claim 1 wherein said solid flowable particulate silicone rubber has a nominal flow rate of at least 0.6 gram/second through a 1.1 diameter pipe 7.6 cm long under applied pressure of 10.34 MPa at room temperature.

3. The method as recited in claim 1 wherein
a. said tool is surrounded with an outer vacuum bag having a hole defined by an edge;
b. said outer vacuum bag edge is sealed to said second tube edge; and
c. a partial vacuum is drawn on said outer bag to remove substantially all air from said void space.

* * * * *